Nov. 10, 1931.  R. R. GRAVES  1,831,383
EDUCATIONAL APPARATUS
Filed Nov. 9, 1927
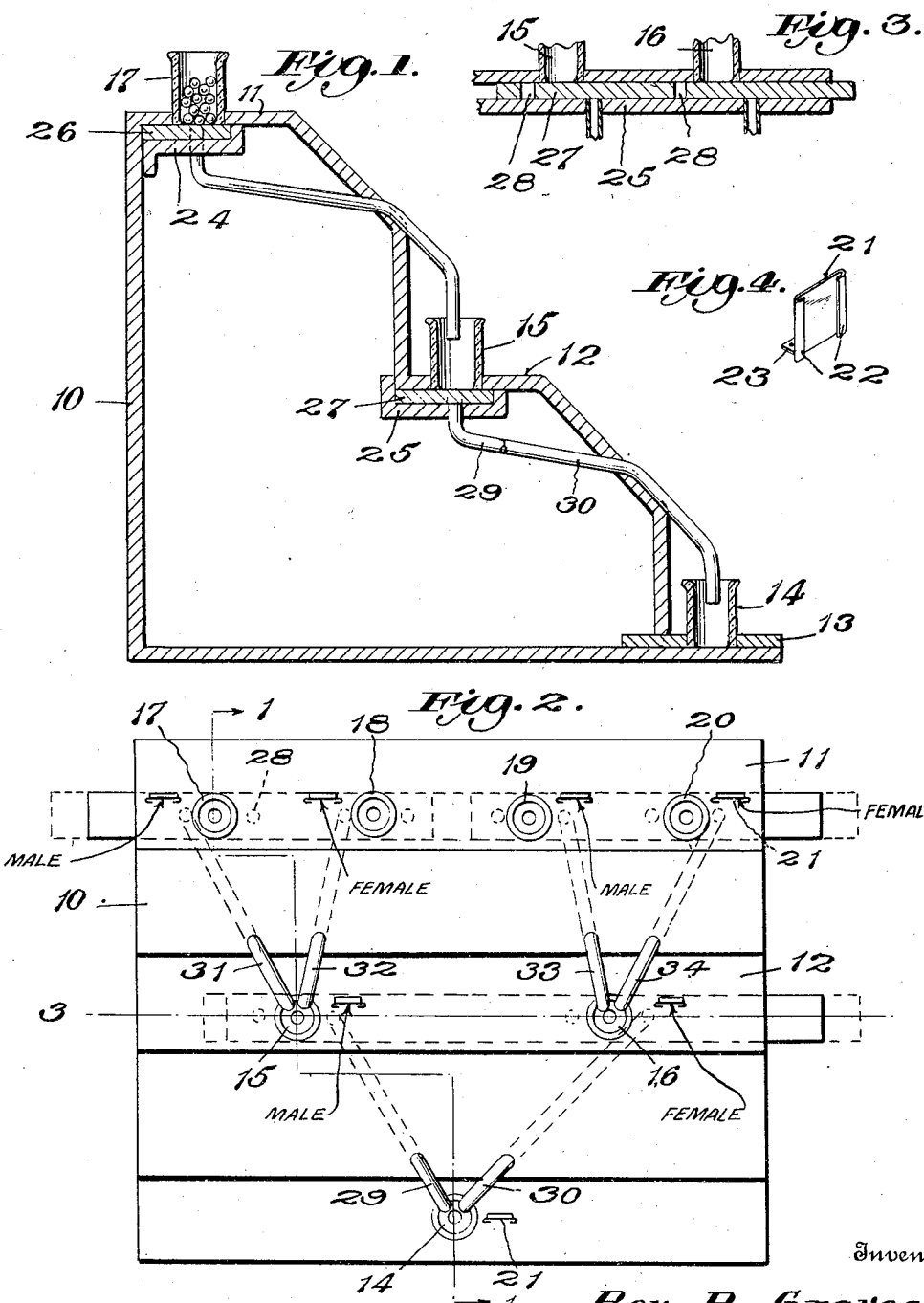
Inventor
Roy R. Graves,
By Steward & McKay
his Attorneys Patented Nov. 10, 1931

1,831,383

UNITED STATES PATENT OFFICE

ROY R. GRAVES, OF KENSINGTON, MARYLAND

EDUCATIONAL APPARATUS

Refiled for abandoned application Serial No. 576,541, filed July 21, 1922. This application filed November 9, 1927. Serial No. 232,140.

My invention relates to educational apparatus, and an object of the invention is to produce an apparatus adapted to a variety of uses both instructive and entertaining. A particular object of my invention is to produce an apparatus adapted to visually illustrate the working of Mendel's law governing the hereditary transmission of characteristics in plants and animals, and thereby to instruct those interested in eugenics and animal and plant breeding how various characters may be transmitted, suppressed or fixed in accordance with the known principles of heredity.

The present application is a substitute for applicant's prior application Serial No. 576,541, filed July 21, 1922.

The following definition of Mendel's law, quoted from Webster's New International Dictionary of the English language, edition of 1920, states the fundamental principles of that law, which it is a particular object of my novel apparatus to illustrate:

"Mendel's law—A principle governing the inheritance of many characters in animals and plants, discovered by George J. Mendel .... in breeding experiments with peas. He showed that the height, color, and other characteristics depend on the presence of determining factors behaving as units. In any given germ cell each of these is either present or absent. The following example (using letters as symbols of the determining factors and hence also of the individuals possessing them) shows the operation of the law: Tallness being due to a factor T, a tall plant, arising by the union in fertilization of two germ cells both bearing this factor, is TT; a dwarf being without T is $tt$. Crossing these, crossbreds $Tt$, result (called generation $F_1$). In the formation of the germ cells of these crossbreds a process of segregation occurs such that germ cells, whether male or female, are produced of two kinds, T and $t$, in equal numbers. The T cells bear the factor "tallness", the $t$ cells are devoid of it. T and $t$, being thus alternative, are called allelomorphs. The offspring generation $F_2$, which arises from the chance union of these germ cells in pairs, according to the law of probability, are therefore on an average in the following proportions: 1TT: 2T$t$: 1$tt$; and thus plants (homozygotes) pure in tallness (TT) and dwarfness ($tt$), as well as crossbreds (heterozygotes) (T$t$) are formed by the interbreeding of crossbreds. Frequently, as in this example, owing to what is called the dominance of a factor, the operation of Mendel's law may be complicated by the fact that when a dominant factor (as T) occurs with its allelomorph (as $t$), called recessive, in the crossbred T$t$, the individual T$t$ is in itself indistinguishable from the pure form TT. Generation $F_1$, containing only the T$t$ form, consists entirely of dominants (tall plants) and generation $F_2$ consists of three dominants (2T$t$, 1TT) to one dwarf ($tt$), which, displaying the feature suppressed in $F_1$, is called recessive. Such qualitative and numerical regularity has been proved to exist in regard to very diverse qualities or characters which compose living things, both wild and domesticated such as colors of flowers, of hair or eyes, patterns, structure, chemical composition, and power of resisting certain diseases. The diversity of forms produced in cross-breeding by horticulturists and fanciers generally results from a process of analytical variation or recombination of the factors composing the parental types. Purity of type consequently acquires a specific meaning. An individual is pure (homozygous) in respect of a given character when it results from the union of two sexual cells both bearing that character, or both without it."

Thus, it appears that in every living thing, plant or animal, resulting from cross breeding, there may be contrasting or opposite factors some of which dominate over others and thus determine the characteristics of the individual. The factors present in the germ plasm but which are thus dominated over and which therefore do not manifest themselves in the individual but remain latent, are those termed recessive or alternative factors in the definition quoted above. A recessive or alternative factor cannot become operative to determine a character of the individual where the dominant factor is present; but in an individual in which the dominant factor is absent, the recessive factor is free to manifest itself and to produce its character in the individual. Thus, in the case of black and red cattle, the black color is a characteristic resulting from a dominant factor and the red color is a characteristic resulting from a recessive factor. If a cow, for example, is red in color, we may be sure that it has no dominant-black-color factor present to suppress it. If that animal is black in color, however, it may be either pure for black, that is having only factors producing that characteristic, or it may have the recessive red-color factor present but latent or dominated. If an animal that is pure for black is mated with an animal that is pure for red, the offspring will be black in color, since, although it will have inherited both color-producing factors, the black is dominant. In the formation of the germ cells of such a cross-bred offspring, whether male or female, as stated in the definition of Mendel's law quoted above, a process of segregation occurs such that germ cells of two kinds are produced in equal numbers, that is half of the germ cells will carry the factor or determiner for black and the other half the factor or determiner for red. It will, therefore, be entirely a matter of chance in the breeding by that individual of the offspring next in line of descent whether the germ cell that is active in that breeding carries the determiner for red or black.

It should also be stated that the dominant or recessive factors determining the transmission of certain characteristics have no influence upon other factors which may be present determining the transmission of other and unlike characteristics. For example, in the specific example given, factors determining whether the cow is red or black have no modifying effect upon factors determining whether the animal is horned or polled, or whether it is a large or a poor producer of milk.

It is to be observed that in considering a line of descent governed by Mendel's law, we start with certain known contrasting or alternative factors and that the element of chance occurs during that descent in the various combinations possible. It is also to be observed that these features of known contrasting or alternative factors and their chance combinations may be employed in a game apparatus. A general object of my invention, as hereinbefore stated is to produce an apparatus adapted for use both as a game apparatus generally and also as an educational device to illustrate the workings of Mendel's law, although it has for its particular object the latter use. As the principles of my novel apparatus are aptly illustrated by its last mentioned use, reference will primarlily be made thereto.

In my novel apparatus the contrasting or alternative factors referred to in the foregoing discussion of Mendel's law, are preferably indicated by suitable counters, such as balls of different colors. Means, which may comprise receptacles or containers, are provided to initially group these balls into a plurality of pairs of groups, each of which pairs may, in illustrating Mendel's law, represent the male and female individuals having the known characters the transmission of which it is desired to study. This initial grouping will, of course, be made according to the known or arbitrarily selected characters, and charts may be employed which show the lists of characters known to be dominant or recessive. The grouping representing an individual pure in breed for a certain character, tallness, for example, will contain only balls of like color, each ball representing the unit or factor designated as T in the definition of Mendel's law quoted above. The grouping representing an individual also pure in breed but for a contrasting or alternative character, shortness for example, will likewise contain only balls of like color but differing in color from those first mentioned, each ball representing the unit or factor designated as $t$ in the definition referred to. The groups representing a crossbred individual having both factors for tallness and shortness but the one dominant and the other recessive, and hence having tallness as its resultant character, will contain balls in equal numbers of the two contrasting colors selected to designate these factors, these balls representing the units or factors T$t$.

Other containers or receptacles are provided in successive series, each series representing a generation, and each receptacle or container of a series being arranged to receive balls in re-groupings from a pair of groups of the preceding series, such re-groupings therefore representing individual offsprings from the parents represented by the respective pairs of groups of the preceding series. Thus, where it is desired to illustrate the transmission of certain characteristics to one individual of the third generation, one container will be employed for the final grouping of the balls representing the factors determinative of the characteristics of that individual. The next preceding series will have two such containers for groupings representing the parents and the next preceding series four such containers for the four grand parents of that individual.

As hereinbefore stated, where an individual has contrasting or alternative factors to transmit, it is entirely a matter of chance as to which of those factors is transmitted. Such an individual is represented in my novel apparatus, as already stated, by a group of balls in equal numbers of the two contrasting colors selected to designate those factors. This element of chance is provided for in my novel apparatus by the means employed for delivering the balls from a pair of containers of one series to a single container of the next succeeding series for the regroupings or recombinations therein hereinbefore referred to. Means are provided for delivering a single ball at a time from each container of a pair representing the parents to the corresponding container representing the offspring, such means being designed to make it entirely a matter of chance as to which ball of the group in the container is thus delivered.

The principles of my invention are fully illustrated in the concrete embodiment thereof hereinafter described and shown in the accompanying drawings. It is to be understood, however, that such embodiment constitutes merely a preferred form of the novel apparatus of the invention, and that within the scope of the invention various other embodiments which may be constructed according to its principles are included.

In the accompanying drawings:

Fig. 1 is a vertical transverse sectional view of the novel apparatus along the line 1—1 of Fig. 2 looking in the direction of the arrows;

Fig. 2 is a top plan view of the apparatus;

Fig. 3 is a vertical sectional view of a part of the apparatus along the line 3—3 of Fig. 2;

Fig. 4 is a perspective view of a card or image supporting rack which may be used with the apparatus.

The illustrative apparatus comprises a box-like frame, indicated generally by the numeral 10, and of such contour and formation as to provide three horizontal supports or platforms 11, 12 and 13 at different levels. The specific apparatus now being described is intended to illustrate the operation of Mendel's law through three generations and the three platforms referred to are employed to support the receptacles or containers for the groupings of the colored balls hereinbefore referred to as used to represent the individuals of these three generations. In the illustrative apparatus these receptacles or containers are glass cylinders, and on the lowermost platform one such cylinder 14 is employed for the single individual offspring of the third generation whose inherited characteristics it is desired to represent. On the intermediate level, are arranged the two cylinders 15 and 16 for the parents of that individual, and on the uppermost level are arranged the four cylinders 17, 18, 19 and 20 for the grandparents.

Any suitable means may be employed to visually indicate the grandparents, parents and offspring, the known characteristics of the grandparents with whom the line of descent is started, and the resulting characteristics of the parents and offspring. For example, images may be employed to indicate the individuals of the various generations, and these images may be properly colored or have changeable parts of different colors to indicate the characteristics undergoing study. For example, removable eyes of different colors may be thus employed. Or cards may be used upon which notations may be made to denote the characteristics undergoing study. In the illustrative apparatus racks are employed designed to mount the images or the cards referred to. These racks may be of any construction suitable for the purpose stated. In the illustrative apparatus, and as shown particularly in Fig. 4, each rack comprises a supporting or backing plate 21 having two opposite sides turned to form slideways 22, which the arms or any lateral projections of the image or the edges of the card can slidingly engage for their ready removal.

Flanges 23 may be provided for suitably attaching the racks in proper positions upon the box-like frame of the apparatus.

The cylinders are each made of such height and diameter as to accommodate a group of balls in substantial numbers and to permit free movements of the balls in substantially all directions throughout the groups.

The lower open ends of the cylinders extend through the platforms 11, 12 and 13, as shown in Fig. 1. Extending beneath and longitudinally of the platforms 11 and 12, and spaced from the lower open ends of the cylinders therein are plates 24 and 25, respectively, forming with the platforms 11 and 12 slideways for the reciprocatory elements 26 and 27. These reciprocatory elements here shown in the form of plates, form closures as well as delivery means for the cylinders, as will later more fully appear. As shown in Figs. 1 and 2, one such reciprocatory element is employed for each pair of cylinders and two pairs of such reciprocatory elements for the two pairs of cylinders on the top level of the apparatus are employed and the two members of each pair of reciprocatory elements are manually operable from opposite ends of the apparatus. Each of the plates 26 and 27 forming the reciprocatory elements referred to is of the same thickness as the diameter of the balls and has an aperture 28 therethrough of just the right diameter to receive therein one ball from the overlying group in the cylinder. Which ball drops into this aperture is a matter of chance since the balls of the overlying group are confined to no fixed positions relative to each other but are freely movable within the group and over the surface of the element having the delivery aperture. Movements of the balls to various chance positions within each group also occur upon each movement of the sliding closure since the upper surface of that closure supports the balls and in its sliding movement would agitate the group. Further chance movements of the balls of each group within their respective cylinders may also be caused by bodily shaking the apparatus.

Delivery tubes extend in pairs from any two cylinders of one series representing the parents to a single cylinder of the next series representing an offspring. Thus the delivery tubes 29 and 30 extend from the two cylinders 15 and 16 representing the parents of the second generation to the single cylinder 14 representing the offspring of the third generation. Tubes 31 and 32 extend from the cylinders 17 and 18 representing the paternal grandparents to the cylinder 15 representing the male offspring of the second generation, and tubes 33 and 34 extend from the cylinders 19 and 20 representing the maternal grandparents to the cylinder 16 represnting the female offspring of the second generation. As shown in Figs. 1 and 2, these tubes, at their upper or receiving ends, extend through the stationary plates 24 and 25 to positions offset from their respective cylinders, so that when a ball is delivered from its group into an aperture 28 in one of the reciprocatory elements 26 and 27, a substantial movement of that element is required to deliver the ball from the aperture therein to the delivery tube which conducts the ball to the next cylinder.

In the use of the apparatus in illustrating or studying Mendel's law, charts or books may be consulted which give the lists of alternative or contrasting characters which are known to be dominant or recessive. Thus, for example, where it is desired to study the transmission of brown and blue eye characteristics in the human family, it will be found that the factors for producing brown eyes are dominant over those for blue eyes. Blue and brown balls will be selected to represent these respective factors. The known eye colors of the ancestry may determine the initial groupings of these balls or an arbitrary eye color may be assigned each grandparent.

Let us assume that the paternal grandfather had blue-eyed parents; consequently he will have blue eyes and only factors for blue. Therefore blue balls will be placed in the cylinder 17 for that grandparent and blue eyes placed in the adjacent image representing him. If we assume that the paternal grandmother had one blue-eyed and one brown-eyed parent, she would have brown eyes but would have factors in equal numbers for both brown and blue. Consequently both brown and blue balls in equal numbers would be placed in the cylinder 18 for that grandparent and brown eyes placed in the adjacent image representing her. Similarly, if we assume that the maternal grandfather had factors for brown eyes only, brown balls only would be placed in the cylinder 19 for that grandparent and brown eyes in his adjacent image. If also the maternal grandmother has brown eyes but factors for both blue and brown, brown and blue balls in equal numbers would be placed in the cylinder 20 and brown eyes in the adjacent image.

With four grandparents of the germinal constitution mentioned, the question is what will be the eye color of the first and second generations of descendants. By moving the slide 26 which is beneath the cylinder 17 containing the group of balls representing the eye-color factors of the paternal grandfather so as to position the aperture 28 therein beneath the cylinder, one ball will be released from the group, and will, upon movement of the slide register its aperture with the mouth of the tube 31, roll through that tube to the cylinder 15 representing the male offspring of the next generation. Since the paternal grandparent had only factors for blue eyes, and only blue balls were contained in cylinder 17 representing him, only blue will be transmitted. The paternal grandmother has factors for both blue and brown, as indicated by the like number of blue and brown balls in the cylinder 18, and only chance will determine whether she will transmit brown or blue-eye factors to her son, just as chance determines when the slide 26 is moved whether a brown or a blue ball will be released from the group to be transferred to the cylinder 15 representing the son. If a blue ball is transmitted, then there will be a group of two blue balls in the cylinder 15, representing like factors and therefore pure for blue, and the son will of course have blue eyes and eyes of such color may be placed in the son's image to indicate that fact. If a brown ball is transmitted, then there will be a group in the cylinder 15 of two balls, one brown and the other blue, and as the brown is dominant, the son will have brown eyes, and brown eyes may be placed in his image to indicate that fact.

Similarly there will be two possible regroupings in the cylinder 16 for the female offspring of the intermediate generation under discussion, resulting from the chance delivery of balls from the cylinders 19 and 20 representing the parents of that offspring. Since brown balls only can be delivered from the cylinder 19 but brown or blue from the cylinder 20, two possible combinations, two brown balls or a brown ball and a blue ball can result. Two brown balls in cylinder 16 will therefore indicate that this female offspring has inherited the brown color factor from both her parents while a brown and blue ball will indicate that she has inherited brown from her father, the only factor he could transmit, and blue from her mother.

What these individuals of the intermediate of the three generations have inherited from their parents will determine what they in turn transmit to their offspring, and the principles of such transmission and the mode of operation of the apparatus in illustrating such transmission are precisely as before.

In the examples given, only one line of character transmission at any one time has been taken for illustration by the apparatus, and this required only the single cylinder for each individual in the line of descent in which to group the balls representing the factors producing the character under consideration. By using several cylinders, however, for each individual as many lines of character transmission may be illustrated as there are cylinders employed. By thus using several cylinders, for each individual n the line of descent, it may be shown how different combinations of factors may be transmitted as eye color, hair color, musical ability, etc.

In the general use of the apparatus in a game of chance, the different colored balls of the initial groupings, may be employed by the contestants as their respective counters with which the game is begun. The apparatus may be operated precisely as before and the result of the game will be determined by the relative numbers of the different balls in the last grouping produced, that is in the cylinder 14. In such general use of the apparatus cards may be employed, inserted in the racks 21—22, upon which the value of the groups of counters with which the game is begun and the resultant value of the re-grouping may be indicated.

What I claim is:

1. In an apparatus of the character described, a plurality of vertically disposed containers, each container of said plurality adapted to receive a plurality of counters such as balls having differing indicia thereon to form a group thereof in each said container, a single container, and conduits between the containers of said plurality and said single container arranged to deliver balls therethrough into said single container, a slide movable transversely of the lower ends of each of said containers and in engagement with the group of balls therein, said slide having an aperture therein of dimensions to receive a single ball from said group, said slide being movable to dispose said aperture beneath said group to receive therefrom one ball at a time from said group, said slide being also movable to dispose said aperture with respect to one of said conduits to deliver said ball thereto, each container of said plurality of containers and said slide being cooperatively arranged to dispose a plurality of said balls of each group loosely in contact with said slide and whereby movement of said slide rearranges the position of said balls in the group.

2. In an apparatus of the character described, a plurality of containers, each container of said plurality adapted to receive a plurality of counters such as balls having differing indicia thereon to form a group thereof in each said container, a single container, and conduits between the containers of said plurality and said single container, means adapted to be manually operated to deliver one ball at a time from each container of said plurality to said single container through said conduits, said means being operable to impart the element of chance determination of the ball delivered from its group.

3. An apparatus for illustrating genealogical descent, comprising in combination, containers adapted to receive counters such as balls and arranged in a plurality of series in descending levels to represent successive generations, means associated with said containers whereby males and females may be visually represented in pairs, passageways arranged between pairs of containers in a series at one level and individual containers in a series at a lower level representing lines of descent, and means for releasing balls in containers at a higher level for travel through said passage-ways to containers at a lower level.

4. An apparatus for illustrating Mendel's law comprising in combination, containers each adapted to receive a plurality of counters such as balls to form a group in each said container to represent differing factors of hereditary transmissible characteristics possessed by the male and female of a given generation, means associated with said containers whereby males and females may be visually represented, conduits arranged between said containers to represent lines of descent, said conduits being adapted to guide movement of said balls in the direction of said lines of descent, and mechanism arranged to deliver one ball at a time from container to container through said conduits in the direction of said lines of descent, said mechanism being operative to indeterminately select the ball from each said group to be delivered.

5. An apparatus for illustrating Mendel's law comprising, in combination, containers each adapted to receive a plurality of counters such as balls to form a group in each said container, said containers arranged in a plurality of series in descending levels to represent successive generations, means associated with said containers whereby males and females may be visually represented in pairs, conduits arranged between pairs of containers in a series in one level to individual containers in a series of the next lower level to represent lines of descent, mechanisms arranged to deliver one ball at a time from container to container through said conduits in the direction of said lines of descent, said mechanisms being operative to indeterminately select the ball from each said group to be delivered.

6. An apparatus for illustrating operation of the laws of heredity, comprising, in combination, a pair of devices representing mating male and female individuals of one generation, a plurality of symbol means as separate units in a group associated with each of said devices with said units indicative of transmissible characteristics of said represented mating male and female individuals, a device representing a descendant individual of the next generation, and means operable to indeterminately select a symbol unit from each group associated with said first-mentioned devices to indicate characteristics transmitted to said descendant individual at a mating and to visually represent said selected units in a new group indicative of the inherited characteristics of said descendant.

7. An apparatus for illustrating operation of the laws of heredity, comprising, in combination, a pair of devices representing mating male and female individuals of one generation, a plurality of symbol means as separate units in a group associated with each of said devices with said units indicative of transmissible characteristics of said represented mating male and female individuals, a device representing a descendant individual of the next generation, and means operable to indeterminately select and present together in a group a symbol unit from each group associated with said first-mentioned devices to indicate characteristics transmitted to said descendant individual at a mating.

8. An apparatus for illustrating operation of the laws of heredity in animals and plants, comprising, in combination, a pair of devices representing male and female individuals of one generation, each of said devices being provided with a plurality of symbol means indicative of differing factors of heredity transmissible characteristics possessed by said represented male and female individuals, a device representing a descendant individual of the next generation to whom under the laws of heredity certain of said factors will be transmitted, and mechanism operable to impart the element of chance determination of which of said symbol means is to indicate the factors to be transmitted, said descendant device being formed for the display of the symbol means indicative of the transmitted factors.

9. An apparatus for illustrating operation of the laws of heredity in animals and plants, comprising, in combination, a pair of devices representing male and female individuals of one generation, a plurality of symbol means for each of said devices indicative of differing factors of heredity transmissible characteristics possessed by said represented male and female individuals, said devices being formed for the display of said symbol means, a device representing a descendant individual of the next generation to whom under the laws of heredity certain of said factors will be transmitted, and mechanism operable to impart the element of chance determination of which of said symbol means displayed by said pair of devices is to indicate the factors transmitted to said descendant, said descendant device being formed for the transfer thereto and display thereon of the symbol means thus determined as indicating the transmitted factors.

10. An apparatus for illustrating operation of the laws of heredity in animals and plants, comprising, in combination, a pair of containers, separate material units of differing characteristics adapting them to be employed in a group in each said container as symbol means indicative of differing factors of heredity transmissible characteristics possessed by a male and female individual of a given generation, a single container formed for the transfer thereto of units from said pair of containers to indicate factors of heredity characteristics transmitted to the individual of the next generation, and mechanism operable to impart the element of chance determination of the units to be transferred from said pair of containers to said single container.

11. An apparatus for illustrating operation of the laws of heredity in animals and plants, comprising, in combination, a pair of containers, separate material units of differing characteristics adapting them to be employed in a group in each said container as symbol means indicative of differing factors of heredity transmissible characteristics possessed by a male and female individual of one generation, a single container and means operable to transfer a unit from each container of said pair to said single container to indicate factors of hereditary characteristics transmitted to the individual of the next generation, said means including mechanism operable to impart the element of chance determination of the factors to be transferred.

12. An apparatus of the character described comprising, in combination, a pair of containers, balls having differing indicia thereon forming a group in each said container, a single container and means operable to transfer one ball at a time from each container of said pair to said single container, said means including mechanism operating upon the group of balls in each container of said pair to impart the element of chance determination of the ball transferred from said group to said single container.

In testimony whereof I hereunto affix my signature.

ROY R. GRAVES.